United States Patent
Cui et al.

(10) Patent No.: US 10,565,511 B1
(45) Date of Patent: Feb. 18, 2020

(54) REVERSE DEBUGGING OF SOFTWARE FAILURES

(71) Applicant: MICROSOFT TECHNOLOGY LICENSING, LLC, Redmond, WA (US)

(72) Inventors: Weidong Cui, Redmond, WA (US); Xinyang Ge, Redmond, WA (US); Baris Can Cengiz Kasikci, Ann Arbor, MI (US); Ben Niu, Bellevue, WA (US); Ruoyu Wang, Tempe, AZ (US); Insu Yun, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/148,810

(22) Filed: Oct. 1, 2018

(51) Int. Cl.
| | |
|---|---|
| G06F 9/44 | (2018.01) |
| G06N 5/04 | (2006.01) |
| G06F 11/36 | (2006.01) |
| G06F 17/27 | (2006.01) |
| G06F 17/28 | (2006.01) |
| G06N 3/08 | (2006.01) |
| G06N 5/02 | (2006.01) |

(52) U.S. Cl.
CPC ............ *G06N 5/04* (2013.01); *G06F 11/364* (2013.01); *G06F 11/3612* (2013.01); *G06F 17/2785* (2013.01); *G06F 17/2818* (2013.01); *G06F 17/2827* (2013.01); *G06N 3/082* (2013.01); *G06N 5/027* (2013.01)

(58) Field of Classification Search
CPC ............ G06N 3/082; G06N 5/04; G06N 5/02; G06N 5/027; G06F 17/2818; G06F 8/437; G06F 17/2827; G06F 17/2785
See application file for complete search history.

(56) References Cited

U.S. PATENT DOCUMENTS

| | | | | |
|---|---|---|---|---|
| 4,970,657 | A * | 11/1990 | Wolf | G06N 5/04 706/52 |
| 6,014,518 | A * | 1/2000 | Steensgaard | G06F 8/437 717/143 |
| 2012/0158398 | A1 * | 6/2012 | Denero | G06F 17/2818 704/2 |
| 2014/0108322 | A1 * | 4/2014 | Buchanan | G06N 5/02 706/50 |
| 2018/0307987 | A1 * | 10/2018 | Bleiweiss | G06N 3/082 |

OTHER PUBLICATIONS

Manevich, et al., "PSE: Explaining Program Failures via Postmortem Static Analysis", In Proceedings of the 12th ACM International Symposium on Foundations of Software Engineering, Oct. 31, 2004, 10 Pages.

(Continued)

*Primary Examiner* — Tuan A Vu
(74) *Attorney, Agent, or Firm* — Workman Nydegger

(57) ABSTRACT

Debugging systems are configured to resolve both memory aliasing conditions in which a write instruction is directed to an unknown destination address, and concurrency conditions in which control flow information is collected for multiple, concurrently executing threads. Recorded state values corresponding to an application's prior execution and control flow information are both obtained.

14 Claims, 13 Drawing Sheets

(56) References Cited

OTHER PUBLICATIONS

Mashtizadeh, et al., "Towards Practical Default-On Multi-Core Record/Replay", In Proceedings of International Conference on Architectural Support for Programming Languages and Operating Systems, Apr. 8, 2017, 16 Pages.

Montesinos, et al., "Capo: A software-hardware Interface for Practical Deterministic Multiprocessor Replay", In Proceedings of International Conference Architectural Support for Programming Languages and Operating Systems, Mar. 1, 2009, 12 Pages.

Montesinos, et al., "DeLorean: Recording and Deterministically Replaying Shared-Memory Multiprocessor Execution Effciently", In Proceedings of International Symposium on Computer Architecture, Jun. 21, 2008, 12 Pages.

Narayanasamy, et al., "Bugnet: Continuously Recording Program Execution for Deterministic Replay Debugging", In Proceedings of International Symposium on Computer Architecture, Jun. 4, 2005, 12 Pages.

Olszewski, et al., "Kendo: Efficient Deterministic Multithreading in Software", In Proceedings of International Conference on Architectural Support for Programming Languages and Operating Systems, Mar. 7, 2009, 12 Pages.

Park, et al., "PRES: Probabilistic Replay with Execution Sketching on Multiprocessors", In Proceedings of ACM Symposium on Operating Systems Principles, Oct. 11, 2009, 15 Pages.

Pokam, et al., "Coreracer: A Practical Memory Race Recorder for Multicore x86 TSO Processors", In Proceedings of IEEE/ACM International Symposium on Microarchitecture, Dec. 3, 2011, 10 Pages.

Veeraraghavan, et al., "Doubleplay: Parallelizing Sequential Logging and Replay", In Proceedings of International Conference on Architectural Support for Programming Languages and Operating Systems, Mar. 5, 2011, 12 Pages.

Xu, et al., "Postmortem Program Analysis with Hardware-enhanced Post-crash Artifacts", In Proceedings of the 26th USENIX Security Symposium, Aug. 16, 2017, 17 Pages.

Yang, et al., "MODIST: Transparent Model Checking of Unmodified Distributed Systems", In Proceedings of the 6th USENIX Symposium on Networked Systems Design and Implementation, Jan. 2009, 16 Pages.

Yin, et al., "How do Fixes become Bugs?", In Proceedings of ACM SIGSOFT European Conference on Foundations of Software Engineering, Sep. 5, 2011, 11 pages.

Zamfir, et al., "Execution synthesis: A Technique for Automated Debugging", In Proceedings of ACM European Conference on Computer Systems, Apr. 13, 2010, 14 Pages.

Zeller, et al., "Simplifying and Isolating Failure-inducing Input", In Proceedings of IEEE Transactions on Software Engineering,vol. 28, Issue 2, Feb. 2002, 17 Pages.

Zhang, et al., "ProRace: Practical data race detection for production use", In Proceedings of the 22nd International Conference on Architectural Support for Programming Languagesand Operating Systems, Apr. 8, 2017, 14 Pages.

"Apple Inc. MacOSX CrashReporter", Retrieved From: https://developer.apple.com/library/content/technotes/tn2004/tn2123.html, Oct. 17, 2018, 19 Pages.

"Arm Embedded Trace Macrocell (ETM)", Retrieved From: http://infocenter.arm.com/help/index.jsp?topic=/com.arm.doc.ihi0014q/index.html, Oct. 17, 2018, 420 Pages.

"Chain Setstate Type Confusion", Retrieved From: https://bugs.python.org/issue28322, Retrieve From: Oct. 17, 2018, 5 Pages.

Liblit, Benjamin Robert, "Cooperative Bug Isolation", Dissertation Submitted in the Partial Satisfaction of Ph.D Computer Science, University of California, Berkeley, Dec. 2004, 172 Pages.

"Exploit Database", Retrieved From: https://www.exploit-db.com/exploits/25005/, Retrieved on: Oct. 17. 2018, 2 Pages.

"GDB and Reverse Debugging", Retrieved From: https://www.gnu.org/software/gdb/news/reversible.html, Retrieved On: Oct. 17, 2018, 2 Pages.

"Google Inc. Chrome Error and Crash Reporting", Retrieved From: http://support.google.com/chrome/answer/96817?hl=enl, Retrieved From: Oct. 17, 2018, 3 Pages.

"If Document-Root Directive in config file has a non existent drive letter httpd crashes". Retrieved From: https://bz.apache.org/bugzilla/show_bug.cgi?id=39722, Retrieved From: Oct. 17, 2018, 2 Pages.

"Integer Overflow in Imageop Module", Retrieved From: https://bugs.python.org/issue1179, Retrieved on: Oct. 17, 2018, 8 Pages.

"Intel Corporation", Intel ® 64 and IA-32 Architectures Software Developer Manuals, Retrieved From: https://software.intel.com/en-us/articles/intel-sdm, Oct. 12, 2016, 2198 Pages.

"Memory corruption when using REST URI", Retrieved From: https://bz.apache.org/bugzilla/show_bug.cgi?id=60324, Oct. 10, 2016, 7 Pages.

"Microsoft Corporation Windows Debugger", Retrieved From: https://docs.microsoft.com/en-us/windows-hardware/drivers/debugger/, Nov. 28, 2017, 3 Pages.

"Microsoft Corporation: Time Travel Debugging", Retrieved From: https://docs.microsoft.com/en-us/windows-hardware/drivers/debugger/time-travel-debugging-overview, Sep. 18, 2017, 8 Pages.

"Mod Usertrack Dumps Core", Retrieved From: https://bz.apache.org/bugzilla/show_bug.cgi?id=24483, Retrieved on: Nov. 7, 2003, 14 Pages.

"Mozilla Corporation: What rr Does", Retrieved From: http://rr-project.org/, Jan. 2015, 5 Pages.

"PDF Import Deadlock", Retrieved From: https://bugs.documentfoundation.org/show_bug.cgl?id=88914, Jan. 29, 2015, 3 Pages.

Gavrun, Alexander, "PHP 'phar' Extension 1.1.1—Heap Overflow", Retrieved From: https://www.exploit-db.com/exploits/17201/, Apr. 22, 2011, 2 Pages.

"PHP: Bug Null Pointer Access Crashed php", Retrieved From: https://bugs.php.net/bug.php?id=76041, Mar. 2, 2018, 2 Pages.

"PHP: Sec Bug", Retrieved From: https://bugs.php.net/bug.php?id=74194, Mar. 2, 2017, 3 Pages.

"Python 2.7 Readahead Feature of File Objects is Not Thread Safe", Retrieved From: https://bugs.python.org/issue31530, Sep. 20, 2017, 8 Pages.

"Rapid Release at Massive Scale", Retrieved From: https://news.ycombinator.com/item?id=15145469, Sep. 1, 2017, 12 Pages.

Cui, et al., "REPT: Reverse Debugging of Failures in Deployed Software", Published in Proceedings of The 13th USENIX Symposium on Operating Systems Design and Implementation, Oct. 8, 2018, 17 Pages.

"Security: V8: Use After Leads to Remote Code Execution", Retrieved From: https://bugs.chromium.org/p/chromium/issues/detail?id=776677, Oct. 20, 2017, 12 Pages.

"Signed Integer Overflow in Blink", Retrieved From: https://bugs.chromium.org/p/chromium/issues/detail?id=784183, Nov. 12, 2017, 5 Pages.

"Ubuntu: Error Tracker", Retrieved From: https://wiki.ubuntu.com/ErrorTracker, Jan. 2017, 16 Pages.

"UndoDB: The interactive reverse debugger for C/C++ on Linux and Android", Retrieved From: https://undo.io/products/undodb/, Jan. 2018, 7 Pages.

"VuNote", Retrieved From: https://github.com/tintinweb/pub/tree/master/pocs/cve-2016-2563, Mar. 8, 2016, 5 Pages.

Abreu, R, et al., "An Evaluation of Similarity Coefficients for Software Fault Localization", In Proceedings of Pacific Rim International Symposium on Dependable Computing, Dec. 18, 2006, 8 Pages.

Arulraj, et al., "Leveraging the Short-term Memory of Hardware to Diagnose Production-run Software Failures", In Proceedings of International Conference on Architectural Support for Programming Languages and Operating Systems, Mar. 1, 2014, 15 Pages.

Arulraj, et al., "Production-run Software Failure Diagnosis via Hardware Performance Counters", In Proceedings of International Conference on Architectural Support for Programming Languages and Operating Systems, Mar. 16, 2013, 12 Pages.

Ball, et al., "A Decade of Software Model Checking with SLAM", In Journal Communications of the ACM, vol. 54 Issue 7, Jul. 2011, 8 Pages.

(56) References Cited

OTHER PUBLICATIONS

Cadar, et al., "KLEE: Unassisted and Automatic Generation of High-Coverage Tests for Complex Systems Programs", In USENIX Conference on Operating Systems Design and Implementation, Dec. 8, 2008, 14 Pages.

Castro, et al., "Better Bug Reporting With Better Privacy", In Proceedings of International Conference on Architectural Support for Programming Languages and Operating Systems, Jan. 2008, 10 Pages.

Chilimbi, et al., "HOLMES: Effective Statistical Debugging via Efficient Path Profiling", In Proceedings of International Conference on Software Engineering, May 16, 2009, 11 pages.

Chipounov, et al., "Enabling Sophisticated Analyses of x86 Binaries with Revgen", In Proceedings of the 41st International Conference on Dependable Systems and Networks Workshop, Jun. 30, 2011, 6 Pages.

Ciortea, et al., "Cloud9: A software Testing Service", In Proceedings of ACM SIGOPS Operating Systems Review vol. 43, Issue 4, Jan. 2010, 6 Pages.

Cui, et al., "RETracer: Triaging Crashes by Reverse Execution from Partial Memory Dumps", In Proceedings of International Conference on Software Engineering, May 14, 2016, 12 Pages.

Engblom, Jakob, "A Review of Reverse Debugging", In Proceedings of the System, Software, SoC and Silicon Debug Conference, Sep. 19, 2012 , 6 Pages.

Fratric, Ivan, "PHP <= 5.2.1 WBMP File Handling Integer Flow", Retrieved From: http://ifsec.blogspot.com/2007/04/php-521-wbmp-file-handling-integer.html, Apr. 7, 2007, 23 Pages.

Gilchrist, Jeff, "Parallel Data Compression with BZIP2", Retrieved From: http://professor.unisinos.br/linds/teoinfo/parallel_bzip2.pdf, Jan. 2017, 6 Pages.

Glerum, et al., "Debugging in the (very) Large: Ten Years of Implementation and Experience", In Proceedings of ACM Symposium on Operating Systems Principles, Oct. 11, 2009, 17 Pages.

Godefroid, et al., "Concurrency at Microsoft—An exploratory survey", In Proceedings Of International Conference on Computer Aided Verification, May 2008, 4 Pages.

Hill, Mark D. "Racey: A Stress Test for Deterministic Execution", Retrieved From: http://pages.cs.wisc.edu/~markhill/racey.html, Dec. 2008, 2 Pages.

Huang, et al., "Towards Production-Run Heisenbugs Reproduction on Commercial Hardware", In Proceedings of the USENIX Annual Technical Conference, Jul. 12, 2017, 15 Pages.

Jin, et al., "Instrumentation and Sampling Strategies for Cooperative Concurrency Bug Isolation", In International Conference on Object Oriented Programming Systems Languages and Applications, Oct. 17, 2010, 15 Pages.

Jones, et al., "Empirical Evaluation of the Tarantula Automatic Fault-localization Technique", In Proceedings of ACM International Conference on Automated Software Engineering, Nov. 7, 2005, 10 Pages.

Kasikci, et al., "Failure Sketching: A Technique for Automated Root cause Diagnosis of in-production failures", In Proceedings of ACM Symposium on Operating Systems Principles, Oct. 4, 2015, 17 Pages.

Kasikci, et al., "Lazy Diagnosis of In-Production Concurrency Bugs", In Proceedings of ACM Symposium on Operating Systems Principles, Oct. 28, 2017, 17 Pages.

* cited by examiner

REVERSE DEBUGGING OF SOFTWARE FAILURES

BACKGROUND

Computers and corresponding software applications are becoming increasingly sophisticated, enabling users to store, access, and manipulate data in a variety of ways. For instance, computer applications can be used to perform word processing, graphic design, audio/visual processing, data analytics, electronic communications, and much more.

Computer applications comprise code in the form of executable instructions that are executed by the processor(s) of a computer system. These instructions are created and sequenced together by a developer in a development environment. Once the instructions are compiled, interpreted, and/or built, the corresponding application can be deployed for use.

Unfortunately, computer systems and applications do not always operate in the manner that is intended or expected and which can result in an application crash, before or after deployment. For at least this reason, it is often necessary to debug an application to identify and fix the instructions in the code that can cause an application to crash.

Different developer tools have also been created to assist a developer in writing, editing, testing, and debugging an application's executable instructions to help mitigate system failures. Some of these tools include program code text editors, source code editors, debuggers, and integrated development environments (IDEs), just to name a few. Unfortunately, however, unnoticed bugs sometimes persist through the development stage and are not noticed until the software application has been deployed for general or widespread use. In circumstances where the application has already been deployed, debugging application failures can be more difficult, inasmuch as greater quantities of code must be examined to identify the instructions that are causing the problems.

Recently, a debugging process known as "time travel" debugging has emerged as a popular technique. With time travel debugging, a tracer program records the state of all the processor instructions and many of the states that exist during execution of a program. Later, when the program is debugged, the tracer data is used to recreate the exact memory and register states that exist at any point during execution, so as identify the specific instructions and locations in the code that caused the error. This technique has been particularly advantageous for developers in a development environment where high resource usage to collect the trace data is somewhat acceptable. However, it is still undesirable because it is so computationally expensive to log all of the data that is included in a heavy trace required for conventional time-travel debugging.

Additionally, it is noted that this type of heavy tracing for time-travel debugging is very impractical for most post deployment scenarios. Accordingly, most post-deployment debugging is notoriously difficult because developers have had to rely on very limited information (e.g., essentially only the information included in a memory dump, which is collected after deployment) as opposed to the vast amount of data collected for time travel debugging that is obtained during development. Even more particularly, it is noted that an application's entire execution history (e.g. time travel trace data) is usually not available because high-fidelity program tracing of those systems is prohibitively expensive (i.e. the client does not want to run a resource intensive debugging program in conjunction with the executing application). This limited availability of information is one of the primary factors as to why debugging already-deployed applications is so difficult.

Some attempts have been made to provide a developer with other data that can be used during debugging, such as client-side debugging data obtained from a sparse processor trace. For instance, Intel's® Processor Trace is a lightweight hardware tracing mechanism that is already included within almost all Intel® processors. A sparse hardware trace, which is also referred to herein as a sparse trace, a thin trace, a thin hardware trace, a sparse/thin trace or a sparse/thin hardware trace, identifies an application's control flow (i.e., a sequence of actual instructions that were executed by the computer system in response to an application's command). While the information can be useful to identify a general flow of the program, this control flow data only identifies the instructions that were executed. It does not describe the data values or even some of the memory addresses that were used. Consequently, use of this sparse data has not substantially improved conventional debugging techniques, particularly time-travel debugging.

Notwithstanding the foregoing, some attempts have been made to derive, or rather infer, the missing data values and missing memory addresses in the above-recited control flow information obtained from using the sparse hardware processor trace. Generally, these attempts combine the state values included within a memory dump with the lightweight hardware tracing data (i.e. the control flow) and then perform a recursive backward analysis to derive the unknown states corresponding to each processor instruction. While some of these debugging techniques have been helpful, these techniques have not been widely adopted because they successfully identify only a small fraction of the total number of processor instruction states.

Coupled with this low performance, existing attempts to debug a program with sparse hardware trace data have encountered significant problems that limit their scalability and practicality. One such problem, for example, is referred to herein as "memory aliasing." This type of problem occurs when a write instruction for an unknown destination address is encountered during the iterative backward inference analysis and the debugger fails to know how to handle state values for that unknown destination address. To address this problem, some existing proposals include making an attempt to infer all of the possible options for all unknown memory locations. However, this type of approach is pragmatically prohibitive because the debugging systems are unable to track and solve all possible inferences for all branches without reaching a critical failure of resources, particularly for large and complex programs. Another approach is to refrain from making any assumptions for any unknown memory locations and corresponding address values. However, this naïve approach is impractical because it effectively prevents the debugging software from identifying/inferring any significant quantity of information, particularly for complex programs. In this regard, both of the foregoing approaches are inadequate and are effectively unscalable. This is particularly true when using sparse/thin hardware trace data to debug programs that have executed large quantities of instructions (e.g., thousands of instructions, tens of thousands of instructions, hundreds of thousands of instructions, or even millions of instructions).

Another problem with time-travel debugging based on sparse hardware trace data is a "concurrency" problem that exists when an application executes on multiple processors and/or with multiple threads that are traced separately. The problem specifically relates to the difficulty in knowing the sequence of instructions, since the different instructions for each trace are not each time stamped. Instead, blocks of instructions are associated with a single timestamp within each of the different traces. Using the block timestamp, it is possible to identify the starting time of each block, but not the specific times and relative sequence of each instruction in the blocks of instructions, particularly when those blocks of instructions executed concurrently with blocks of instructions executing on other threads. Existing debugging systems are simply unable to handle this concurrency problem because of the potential for exponential branching/analysis that would be required to infer all possible sequencing options.

In view of the foregoing, it will be appreciated that there is an existing need to identify debugging solutions that mitigate memory aliasing and/or multi-thread concurrency problems that result from time-travel debugging with sparse/thin hardware traces and, particularly, solutions that can be effectively scaled.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include computer systems, methods, and hardware storage devices that are configured to utilize sparse hardware trace data (e.g., control flow data) coupled with a limited set of recorded state values to perform debugging.

In some instances, the debugging is performed in such a manner as to intelligently determine when to refrain from making inferences that could lead to prohibitive analysis, thereby mitigating against memory aliasing and/or multi-thread concurrency problems during time-travel debugging.

In some embodiments, the disclosed debugging processes include a computer system obtaining a set of recorded state values corresponding to an application's prior execution. As an example, these recorded state values may be included in a memory dump (e.g., from an application crash) or as a result of a manually triggered stop of the application corresponding to a breakpoint or another specified location within the code being debugged. Additionally, control flow information is obtained from hardware trace data that is included in a thin hardware trace of the application's prior execution. The control flow information describes the sequence for a set of processor instructions that executed during the application's prior execution. Subsequently, an iterative backward and forward analysis of the set of processor instructions is performed to identify at least some of the program or processor states corresponding to the processor instructions. During the iterative backward and forward analysis, when a memory write instruction is encountered with an unknown destination write address (thereby causing a memory aliasing condition), the iterative backward and forward analysis refrains from inferring an unrecorded program state value at the unknown destination address for the memory write instruction. Consequently, a stale value in the unknown destination address remains unmodified by the memory write instruction at least until a conflict associated with the unknown destination address is subsequently detected. Upon detecting such a conflict, the stale value in the unknown destination address, if correctable, is corrected via an error correction technique. If, however, the stale value is not correctable, then an indication is provided to show that the stale value cannot be corrected and is not to be used for further inferences during the forward and backward analysis. Accordingly, in some instances, these processes can be used to address memory aliasing conditions.

Related embodiments are also provided, which can be used to help address concurrency issues related to multi-thread implementations. In these embodiments, a set of recorded state values corresponding to an application's prior execution is obtained. Additionally, thin hardware trace data corresponding to the application's prior execution is identified. Here, the thin hardware trace data includes control flow information for operation blocks of processor instructions that executed during the application's prior execution as well as a corresponding operation block timestamp for each of the operation blocks. In this case, at least some of the operation blocks are executed by different processor threads (thereby causing a concurrency condition). A single merged sequence listing of operation blocks is then generated by sequentially ordering each of the operation blocks based on its corresponding operation block timestamp. Thereafter, program states for at least some of the identified processor instructions are identified. This is achieved by performing an iterative backward and forward analysis of the processor instructions included in the single sequence listing of operation blocks. Accordingly, in some instances, these processes can be used to generate a single merged listing to resolve some of the known concurrency issues.

In some embodiments, as a part of sequentially ordering the operation blocks as described above, certain overlapping operation blocks are identified, where these overlapping operation blocks have overlapping execution periods of time based on their corresponding operation block timestamps. Upon determining that at least two of the overlapping operation blocks access a same memory location and that at least one of those at least two overlapping operation blocks includes a write instruction to the memory location, those at least two overlapping operation blocks are flagged to prevent the memory location from being used to make inferences (e.g., during an iterative backward and forward analysis). If the overlapping operation blocks do not include a write instruction to a same memory location, then the merging of the instructions from those operation blocks is not flagged and those operation blocks are merged with an arbitrary ordering (relative to each other) into the single merged sequence of instructions. In this regard, the disclosed embodiments can be used to help address multi-thread concurrency issues by generating a single merged sequence of operation blocks from different threads, which includes merging some of the operation blocks having concurrent timing of operations with an arbitrary ordering in the merged sequence, and while identifying memory locations to refrain from using for making inferences during the iterative backward and forward debugging analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
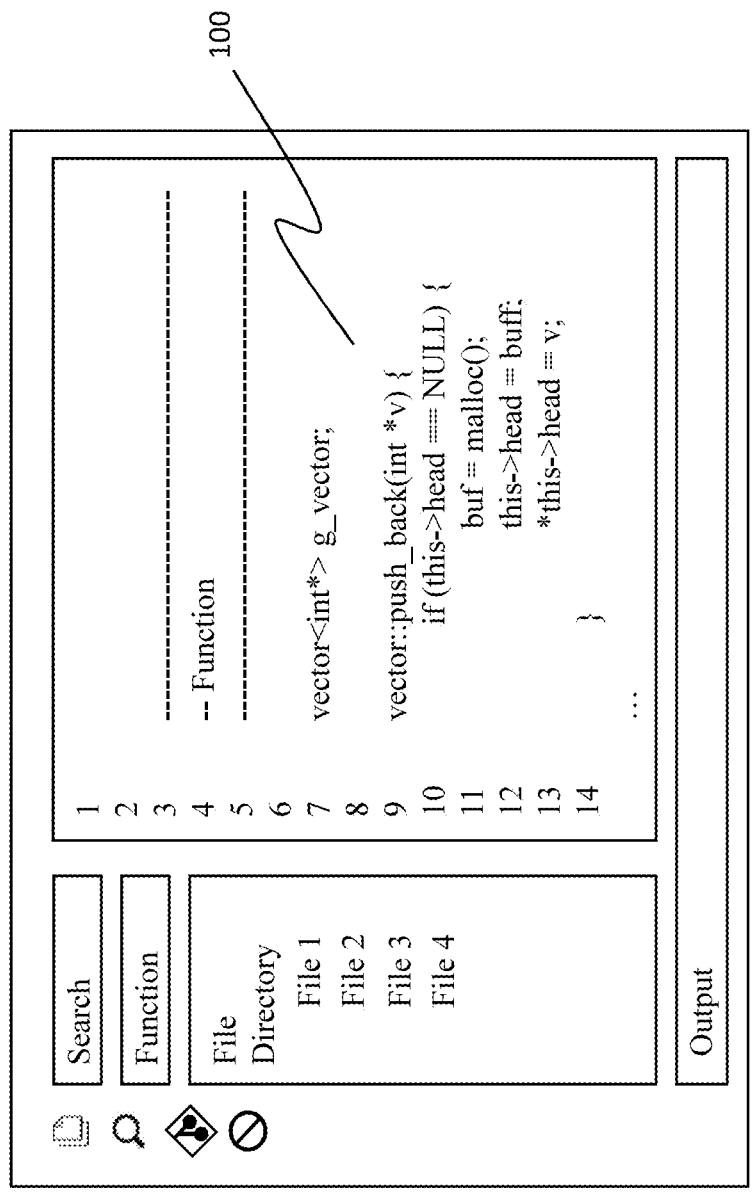
FIG. 1 illustrates an example of an IDE (integrated development environment) in which source code can be developed and displayed.

Disclosed embodiments include computer systems, methods, and hardware storage devices that are configured to utilize sparse hardware trace data (e.g., control flow data) coupled with a limited set of recorded state values to perform time travel debugging in such a manner as to intelligently determine when to refrain from making inferences that could lead to prohibitive analysis, thereby mitigating against memory aliasing and/or multi-thread concurrency problems.

In some embodiments, a set of recorded state values corresponding to an application's prior execution is obtained, such as from a memory dump or as a result of a manually triggered stop of the application corresponding to a breakpoint or another specified location within the code being debugged. Control flow information is also obtained from hardware trace data that is included in a sparse hardware trace of the application's prior execution, which describes the sequence for a set of processor instructions that executed during the application's prior execution, but which omits detailed timestamp information for each processor instruction and/or which omits memory addresses and/or values associated with each processor instruction.

Subsequently, during an iterative backward and forward analysis of the set of processor instructions, at least some of the program or processor states corresponding to the processor instructions are identified. This process iterates until no more new states/values are identified, or rather inferred. Additionally, during the iterative backward and forward analysis, when a memory write instruction is encountered with an unknown destination write address (which can cause a memory aliasing condition, with multiple possible inferred locations for that memory write instruction), the iterative backward and forward analysis refrains from inferring an unrecorded program state value at the unknown destination address for the memory write instruction. As a result, a stale value in the unknown destination address remains unmodified by the memory write instruction, at least until a conflict associated with the unknown destination address is subsequently detected. Upon detecting such a conflict during subsequent backward/forward analysis, the stale value in the unknown destination address, if correctable, is corrected via an error correction technique. If, however, the stale value is not correctable, then an indication is provided to show this that the stale value cannot be corrected and is not to be used for further inferences during the forward and backward analysis.

By implementing the time travel debugging in this manner, it is possible to identify a greater quantity of values for the processor instructions than would be possible if all unknown memory locations were ignored (or refrained from being used) in the debugging analysis, and while still providing a solution that is scalable by not inferring all possible options for unknown memory locations. This is a technical benefit for improving the manner in which time travel debugging can be accomplished with sparse hardware traces, and which can be used to address the technical problem of memory aliasing that occurs during debugging with sparse hardware traces.

Disclosed embodiments can also be used to address the technical problem of concurrency that is associated with time travel debugging for multi-thread/processor scenarios. For instance, in some embodiments, a set of recorded state values corresponding to an application's prior execution is obtained (e.g., in response to a dump or developer triggered event). Additionally, the sparse hardware trace data comprising control flow information for operation blocks of processor instructions that executed during the application's prior execution are obtained, along with sparse timestamp data, which indicates at least one timestamp for each operation block, but that does not include a timestamp for each processor instruction in the operation blocks.

Then, a single merged sequence listing of operation blocks is generated by sequentially ordering each of the operation blocks based on the corresponding operation block timestamps. At least some of the operation blocks that were executed during concurrent time periods are sequenced in an arbitrary order, based on determining that these operation blocks do not include any write instructions to an unknown memory location.

Thereafter, program states for at least some of the identified processor instructions are identified by performing an iterative backward and forward analysis of the processor instructions included in the single merged sequence listing of operation blocks.

When concurrently executed operation blocks are discovered, for which at least one processor instruction comprises a write to an unknown location (as discovered during the backward/forward analysis), that operation block is flagged so that it (or its particular write operation) is not used in making any inferences for any values that are inferred during the backward/forward analysis of the merged sequence of operations.

By implementing the time travel debugging in this manner, it is possible to identify a greater quantity of values for the processor instructions than would be possible if all unknown memory locations were ignored (or refrained from being used) in the analysis, and while still providing a solution that is scalable by not inferring all possible options for unknown memory locations and without having to infer all possible sequences of operations for multi-thread operations. This is a technical benefit for improving the manner in which time travel debugging can be accomplished with sparse hardware traces, and which can be used to address the technical problem of memory aliasing and multi-thread concurrency that occurs during debugging with sparse hardware traces for applications executed with multiple processors/threads.

Attention is now directed to FIG. 1, which illustrates an example of an IDE (Integrated Development Environment) in which a developer can develop and analyze code, such as example code 100, which can be written in a variety of different programming languages.

Figure 2:
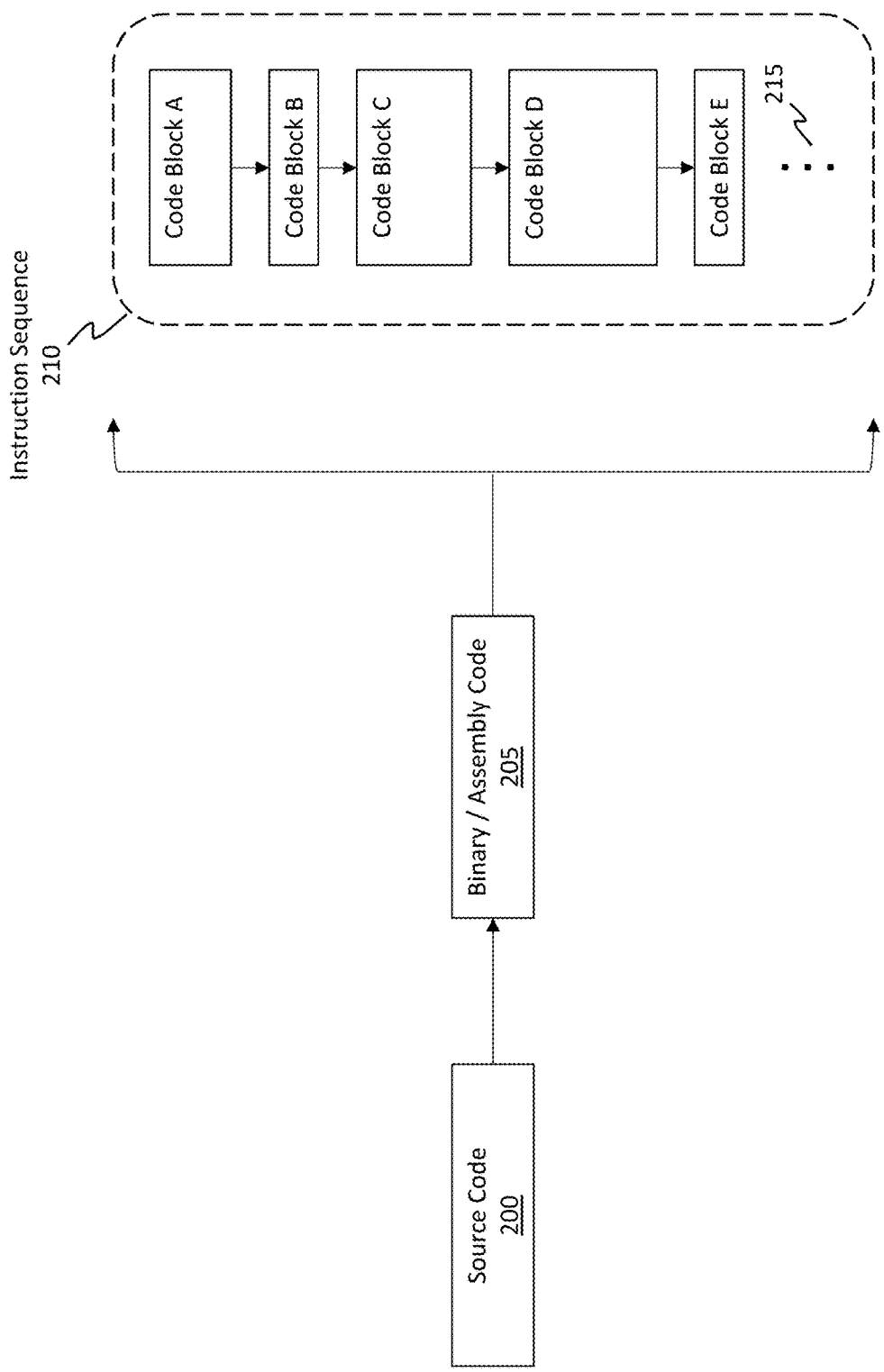
FIG. 2 illustrates a flow of source code that is compiled into binary/assembly code and which is subsequently executed as code blocks by one or more processor thread(s).

FIG. 2 illustrates how this code, also referred to as source code 200, is compiled into binary or assembly code 205. Thereafter, this assembly code 205 is executed as a sequence of processor instructions 210 by one or more processors to implement the application's functionality described in the code. It is noted that each of the illustrated code blocks (e.g., Code Block A-Code Block E, with the ellipsis 215 demonstrating that any number of code blocks may be present) can each comprise a plurality of separate processor instructions.

During operation, the processor instructions are logged, such as with a trace that reflects information that identifies a type of instruction that is implemented and, sometimes, the timestamp and/or memory location associated with the processor instruction. These types of traces can be logged as a software solution, to be referenced at a later time for debugging. However, the more information that is gathered as part of the trace, the more expensive the tracing becomes. In practice, it is too computationally expensive to generate a heavy trace that logs every state of every register for all processor instructions that are executed during operation of an application.

Accordingly, some systems refrain from creating and storing full traces. Instead, some systems trace more limited sets of the execution information (e.g., using hardware tracing as opposed to software tracing) and infer unknown state values through a process referred to as time travel debugging. In such instances, the system refers to a known state of the program (such as may be obtained during a crash dump) and then uses this initial known information to extrapolate previously unknown state values.

Figure 3:
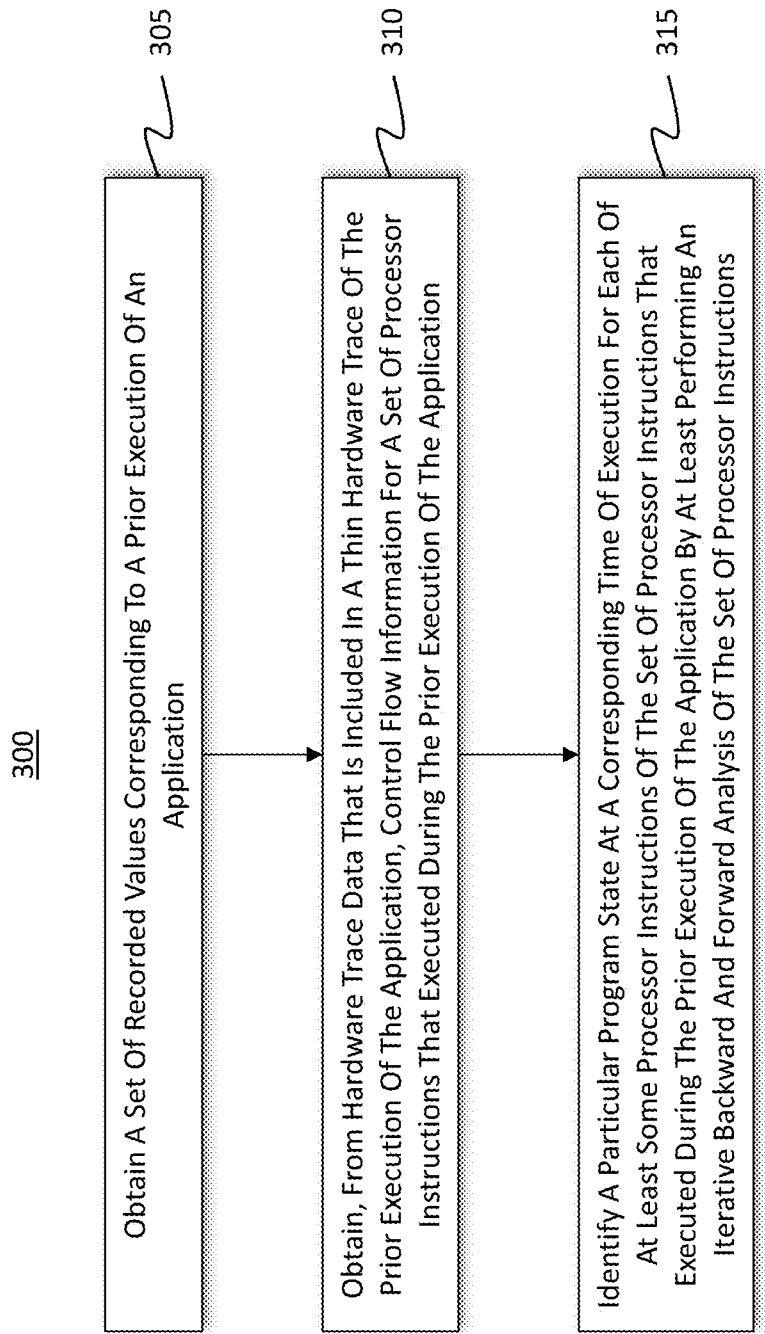
FIG. 3 illustrates a flow diagram of acts associated with debugging.

This is illustrated in the flow diagram of FIG. 3, for example. As shown, a system may obtain a set of recorded values corresponding to a prior execution of an application (act 305). This set of recorded values may comprise the final state of an application, as reflected in a core dump that resulted from an unexpected crash, for example. In other embodiments, the recorded values can be obtained from a program in response to an intentional user selected collection event, such as a developer selecting the current/recorded values that exist for a program at a break point or other instance in the source code of a program that has executed or that is executing.

The system also obtains control flow information for a set of processor instructions that executed during the prior execution of the application (act 310). This control flow information may be obtained from a thin/sparse hardware trace, for example, such as an Intel® PT (processor trace), or any other processor trace that omits values for a plurality of different memory locations and which may also omit timestamps for each processor instruction in the set of identified preceding processor instructions. This set of instructions may also comprise any quantity of instructions that preceded the 'final' recorded state of the program, as identified from the dump or user triggered event for collecting the recorded values.

However, in some instances, the trace (even though sparse) may not include a full set of control flow information for all processor instructions preceding the final recorded state. For instance, the recording of the trace in a ring buffer can effectively limit the quantity of instructions and corresponding control flow information that can be recorded to the fixed size of the ring buffer. In other instances, the trace includes hardware trace data (i.e. sparse data as opposed to the expansive amount of data used in traditional time travel debugging) spanning all or a substantial portion of the application's execution and is stored in an expansive store, such that the trace is a full set of control flow information that preceded the final recorded state of the program.

Then, using this final recorded state information and the control flow information obtained from the sparse trace, the system identifies the state information for at least some of the preceding processor instructions by performing an iterative backward and forward analysis of the processor instructions (act 315). This process includes identifying an instruction of a previous and unknown state of the program (e.g., a register value, memory value, memory address, etc.) to extrapolate what the state must have been prior to the execution of that prior instruction. By way of example, if a known state value for a memory location (A) is 4 (e.g., at the time of the memory dump or breakpoint, the final state value is known to be 4), but the previous value at that memory location (A) is unknown, it is possible to extrapolate, infer, or derive that value by reviewing the previous instruction in the trace. For instance, if such an instruction is an instruction to increment the value at memory location (A) by 1, then it can be inferred/extrapolated that the prior state value at memory location was 3. In some cases, to infer a state value, the iterative backward and forward analysis recursively goes backward 1 instruction step, 2 instruction steps, 3 instruction steps, 4 instruction steps or more and then recursively goes forward 1, 2, 3, 4 (or more) instruction steps in order to infer the state value. In this regard, the iterative backward and forward analysis may travel backward and forward in time any number of processor steps in an attempt to derive/infer state values.

As indicated above, once the processor instructions are traversed (in reverse) to identify one, some, or all values possible, the system can then traverse forward through the processor instructions to infer new states that may have been unknown and that can now be resolved with the inferred information. This backward/forward debugging process can continue until all values are known and/or until the system can no longer solve for unknown values.

Unfortunately, if there are significant quantities of unknown values (such as often occurs when utilizing a sparse hardware trace) then a problem of memory aliasing can occur, as previously described. For instance, if an instruction is to read or write a value for a particular address (which is unknown), it is not possible to infer/extrapolate what that address is in all situations (even when referencing prior instructions). To address this problem, some systems infer and track all possible address locations. However, this exponential analysis is not scalable and can crash a debugger before a significant quantity of unknown values can be resolved. Other systems ignore all unknown values during the extrapolation process and only resolve those that are obvious. However, large quantities of unknown values can also result in a system being unscalable, inasmuch as it is effectively unable to make enough inferences to provide a practical debugging solution.

Some of the currently disclosed embodiments provide a solution that selectively ignores some unknown values corresponding to write instructions, while still inferring other unknown values, to thereby address the memory aliasing problem. This will be discussed in more detail with regard to FIGS. 4A-6.

Figure 4A:
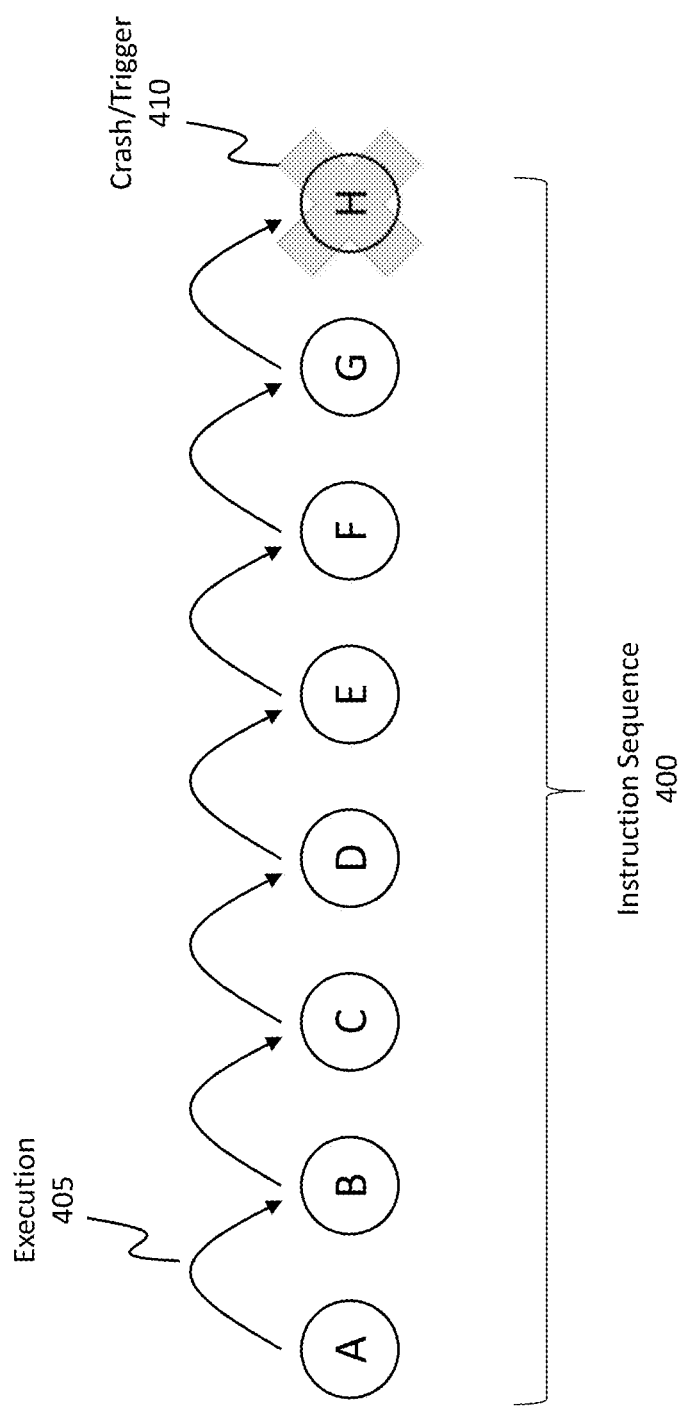
FIGS. 4A and 4B illustrate a sequence of processor instructions and a corresponding control flow for the processor instructions, as well as a final recorded state for the processor instructions which is collected as a result of a crash or triggering event terminating the sequence of processor instructions.
Figure 4B:
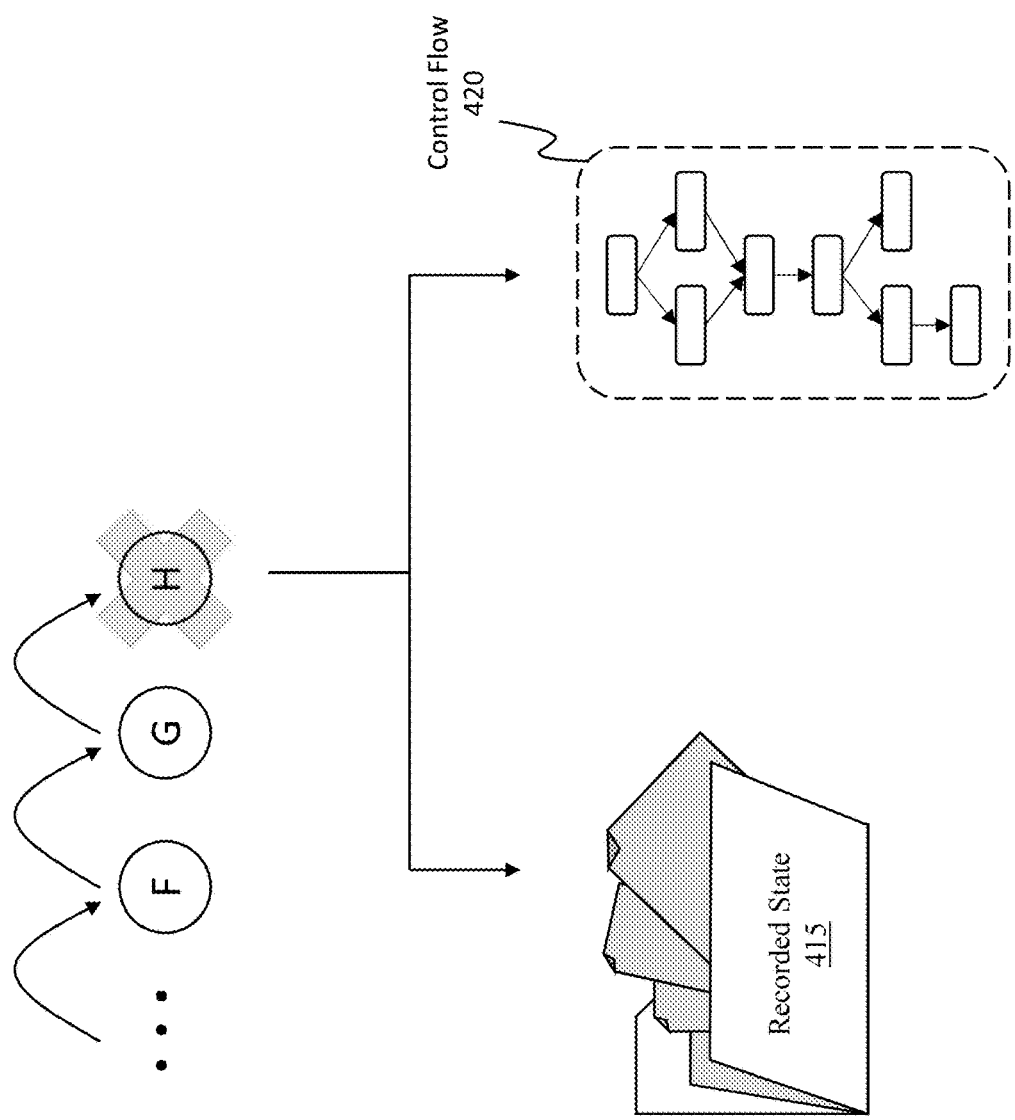

FIGS. 4A-4B illustrate a sequence of individual processor instructions (A, B, C, D, E, F, G and H) or, alternatively, blocks of instructions, that are ordered in an instruction sequence 400 that undergoes processor execution 405 during operation of a program. As also shown, in this example, the final execution (or attempted execution) of processor instruction H corresponds with a crash or triggering event at which point a final recorded state 415 (see FIG. 4B) of the program is logged. This final recorded state 415 may comprise a core dump. Alternatively, this final recorded state 415 may comprise a log corresponding to a break point or other location in the source code that is specified by a user and that is obtained during execution of the program.

The instruction sequence also corresponds to a control flow 420 (see FIG. 4B) that is identified by a sparse hardware trace. Notably, this sparse trace omits at least some timestamps and/or memory locations that correspond to the states of each processor instruction (e.g., instructions A, B, C, D, E, F, G or H). This control flow 420 maintains information that indicates branching of the source code during execution and which may not be simple sequential processing that is appears to be suggested from the execution 405 of instructions A, B, C, D, E, F, G and H. The control flow 420 also identifies the types of processor instructions that are executed, even though the actual state values of those instructions (e.g., memory locations and values in those locations) are not recorded or included in the control flow 420 or recorded state 415 for each instruction.

In order to effectively debug a program, a developer will need to evaluate the instructions that cause a particular result (e.g., a crash, a particular value to be set, etc.). This may require analyzing the processor instructions in the source code that preceded the 'particular result' and the resulting state of each of these instructions. However, when relying on only the recorded state 415 and control flow 420 from a sparse trace, there are many states that are unknown. Accordingly, it is necessary to resolve as many of the unknown state values as possible to make the debugging process effective.

One way to resolve unknown state values based on control flow information and a final recorded state of a program is to generate and resolve/populate a data inference graph that identifies the different execution time sequences for the preceding processor instructions identified in the control flow and the corresponding processor states for each of those instructions, based on inferences derived from the final recorded state and a backward/forward analysis.

Figure 5A:
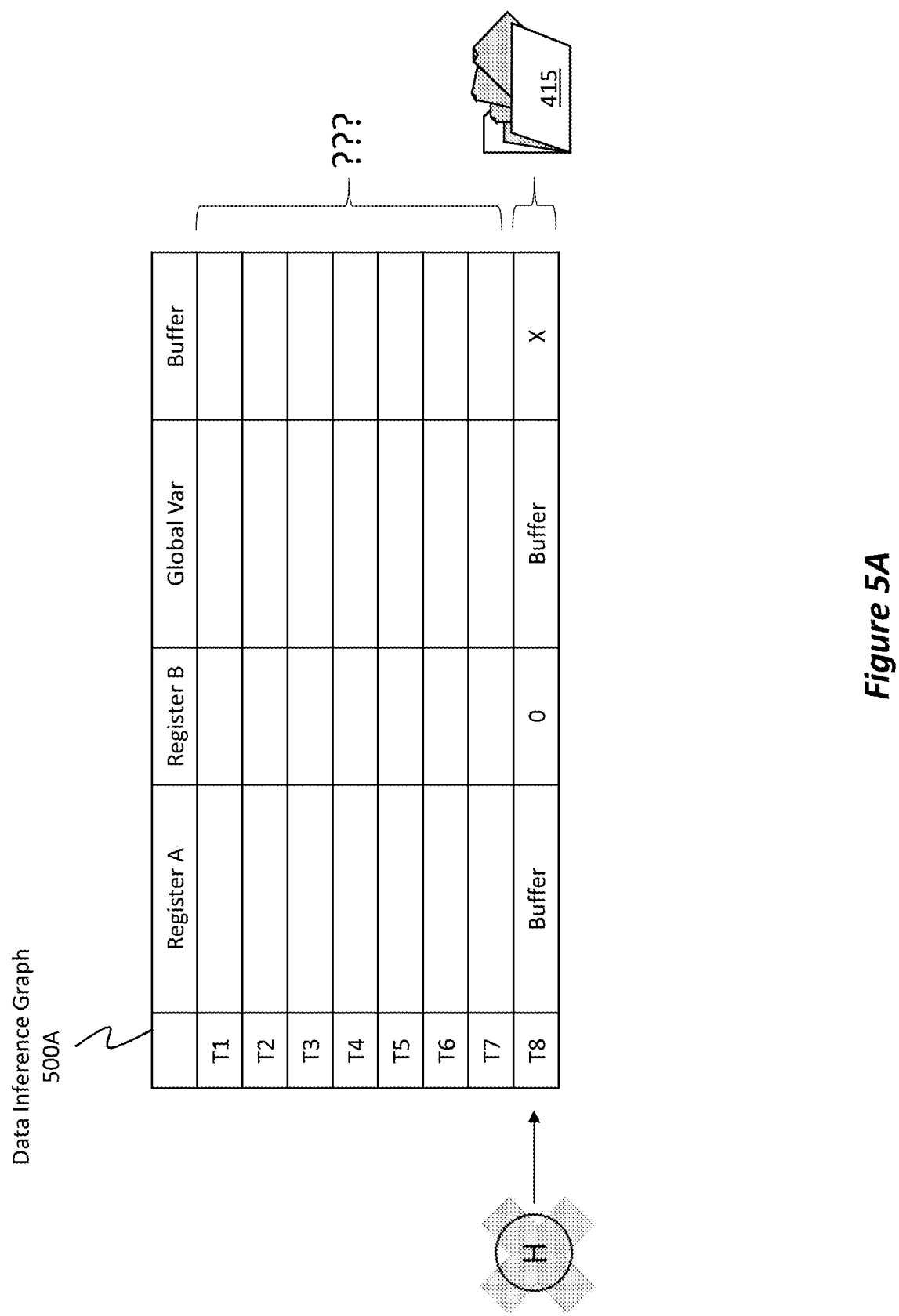
FIGS. 5A and 5B illustrate a data inference graph that is populated with information obtained from an iterative backward and forward analysis of the control flow and final recorded state information associated with the processor instructions referenced in FIGS. 4A and 4B.

FIG. 5A illustrates an example of a data inference graph 500A that is used to identify the processor states for the control flow 420 and recorded state 415 information shown in FIG. 4B and which corresponds to the execution 405 of the instruction sequence 400 of FIG. 4A. This inference graph includes the register states/values that exist for each processor instruction in the instruction sequence 400. For instance, the first line in the data inference graph 500A corresponds to execution of processor instruction A at relative execution time T1. Likewise, the second line corresponds to execution of processor instruction B at relative execution time T2, the third line corresponds to execution of processor instruction C at relative execution time T3, the fourth line corresponds to execution of processor instruction D at relative execution time T4, the fifth line corresponds to execution of processor instruction E at relative execution time T5, the sixth line corresponds to execution of processor instruction F at relative execution time T6, the seventh line corresponds to execution of processor instruction G at relative execution time T7, the eighth line corresponds to execution of processor instruction H at relative execution time T8 and includes state information obtained from the final recorded state 415 associated execution or attempted execution of processor instruction H.

Notably, the execution times (T1-T8) are relative times, since the control flow 420 (in some cases) may not maintain this actual information for each processor instruction. However, for some embodiments (as discussed below), the timestamps are known and are code block timestamps associated with the different blocks of code, such as if the illustrated instructions (e.g., A, B, C, D, E, F, G and H) of instruction sequence 400 comprised actual blocks of code.

Returning now to the data inference graph 500A, it is noted that in this example scenario there are four different columns of information that can be determined for each processor instruction. However, this example is only illustrative and not limiting. Accordingly, it will be appreciated that the data inference graph 500A may contain many more columns (or less columns) of information corresponding to the different processor and memory locations associated with the processor states of a processor executing a program and which are collectively referred to herein as state values. These state values may include register values (e.g., values at Register A, Register B, etc.) and various addresses values (e.g., addresses corresponding to a Global Var, buffer, etc.). The state values may also include, in some instances, time stamps (not shown).

Figure 5B:
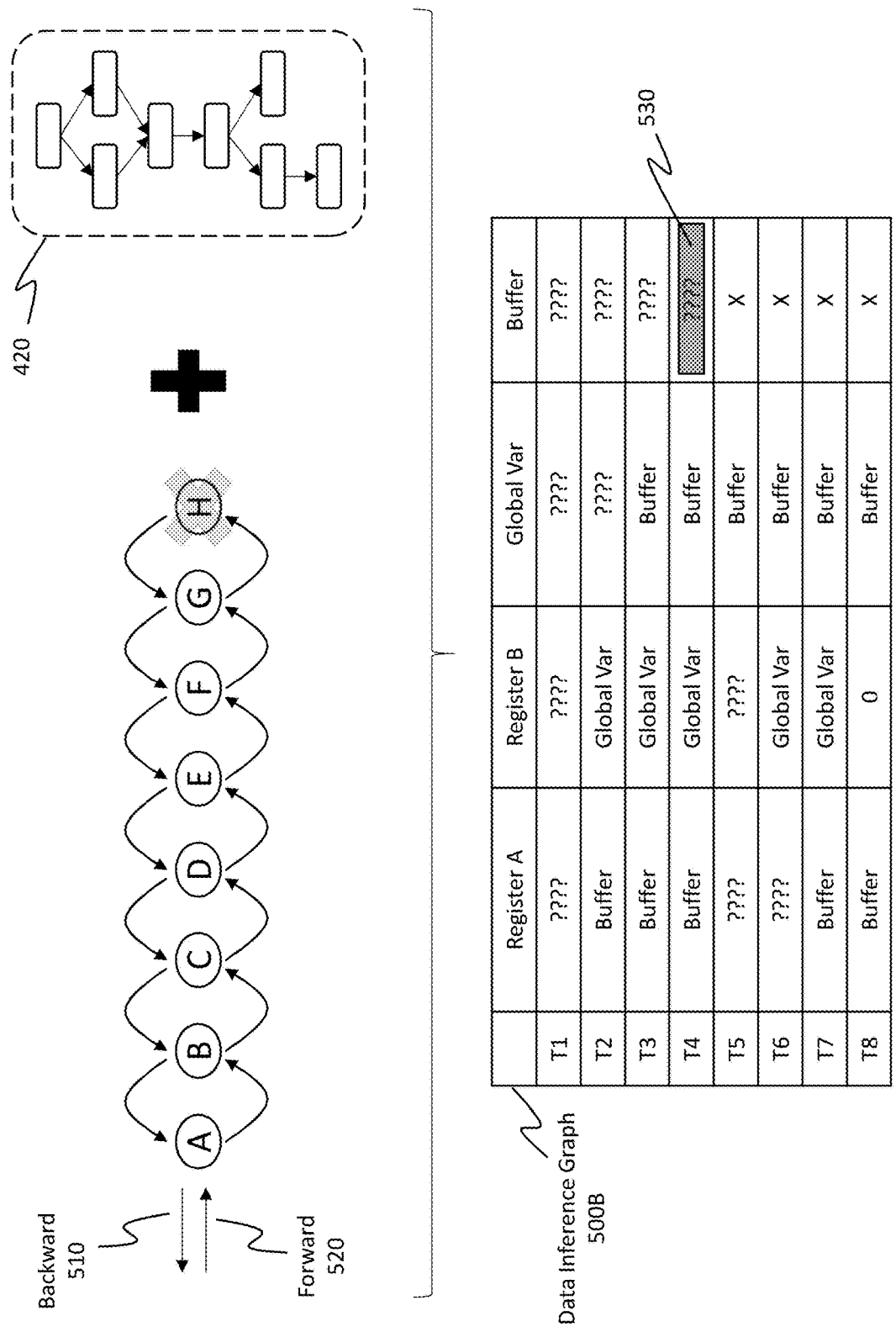

FIG. 5B illustrates the data inference graph 500A (FIG. 5A) can be resolved or populated, based on deductions/inferences that are achieved by performing the iterative backward 510 and forward 520 analysis described above.

It will be appreciated that the new state data that is inferred/deduced during this analysis and which results in the more populated data inference graph 500B of FIG. 5B is an iterative process that may involve various passes through the control flow, starting with only the actual state values for each of the different processor instructions identified in the recorded state 415 obtained from the core dump or other extraction process and based on the control flow instruction information. For example, in some instances, the debugger traverses backward 510 all the way through the control flow information (e.g., from T8 backward in time to T1), inferring/determining any possible new values in the data inference graph that it can using the initial limited information provided from the final state values (i.e. those values recorded in line T8).

The analysis also traverses forward through the control flow in a forward 520 direction, using the control flow information and the newly inferred values to identify additional new values that were not inferred/determined in the backward 510 processing. This process may continuously repeat, iteratively alternating between the forward and backward analysis, until there are no new state values discovered and/or until a predetermined time has passed and/or until a predetermined quantity of iterations have occurred.

In some instances, during the backward/forward analysis, the debugger identifies a write operation to an unknown destination address. For instance, in the current example, instruction D (corresponding to execution time T4) may cause a write operation to Buffer having an address that is unknown. In such instances, rather than trying to infer the actual value of that address (and/or tracking all possible options), the debugger ignores or leaves the state as a stale value (whatever it was before). For instance, in this case, the stale value of the corresponding Buffer destination address is abstractly represented as value (X), which is the same value that existed in the Buffer at the time of the dump (e.g., time of execution T8), but which is an unknown destination address.

This value (X) was propagated up (as a stale value) in the data inference graph 500B during the backward analysis 510 due to the control flow 420 information that (according to the current example) specified instructions at execution time T5, T6, T7 and T8 that left the value of that destination address unmodified. This stale value can be used to make inferences, unless and until a write operation is detected in the control flow information that is directed to that unknown destination address.

Then, in response to detecting an instruction in the control flow 420 for writing to that unknown destination address (e.g., a write to Buffer at execution time T4, corresponding to code block D), the value for that destination address (X) is locked and prevented from being used to make further inferences in the iterative backward and forward analysis unless and until a conflict for that same address location (X) is later discovered. This is reflected by the "????" in cell 530, as well as the first three boxes of Buffer column, since no further inferences are being made off of that destination address. Later, however, if a conflict is discovered, such as another instruction that causes a write to the same unknown destination address (e.g., the destination address for Buffer at execution time T4), then the system will resolve the conflict and determine which value should be used.

Various heuristics, including additional analysis of the processor instructions and other information identified in the control flow 420, can be used to select between two conflicting values (one of which is a stale value) to determine which value is more suitable. If, for instance, a conflicting instruction for the destination address is discovered, which specifies the destination address as a value of Y and it is determined that this Y value is more correct than the stale X value (due to the heuristics and other analysis), then the value Y would be used to populate the corresponding cell 530, as this unknown value is determined to be correctable. Alternatively, it may be determined that the value X is more correct (in other situations) because an instruction associated with the Y value may not be conditional and may be ignored or uncertain based on other instructions in the control flow. In these instances, it may be determined that the value X is correct and is unlocked to make further inferences.

In some instances, the stale value is correctable and is corrected by recovering the unknown destination address from other information accessible to the system (e.g., other control flow information obtained from another instruction, other IDE information, other stored state information, in response to user input, etc.) and then using the recovered unknown destination address to infer an actual value for the stale value.

In yet other instances, there is not enough information available to resolve a conflict for a locked stale value to a threshold degree of certainty, and such that it remains uncorrectable. In such instances, the value remains locked from making further inferences and can be flagged within the inference table to prevent further inferences from being made from the unknown value. This may simply include ignoring the memory write instruction in some instances.

While this may limit the total number of inferences that can be made for the data inference graph, it still allows some inferences to be made, by only selectively locking down destination address values from being used to make inference when there is a detected write operation for those destination address location. This technique also further allows some of the locked down values to be unlocked to make further inferences when a conflict is later discovered for the locked values and in response to resolving the conflict.

Figure 6:
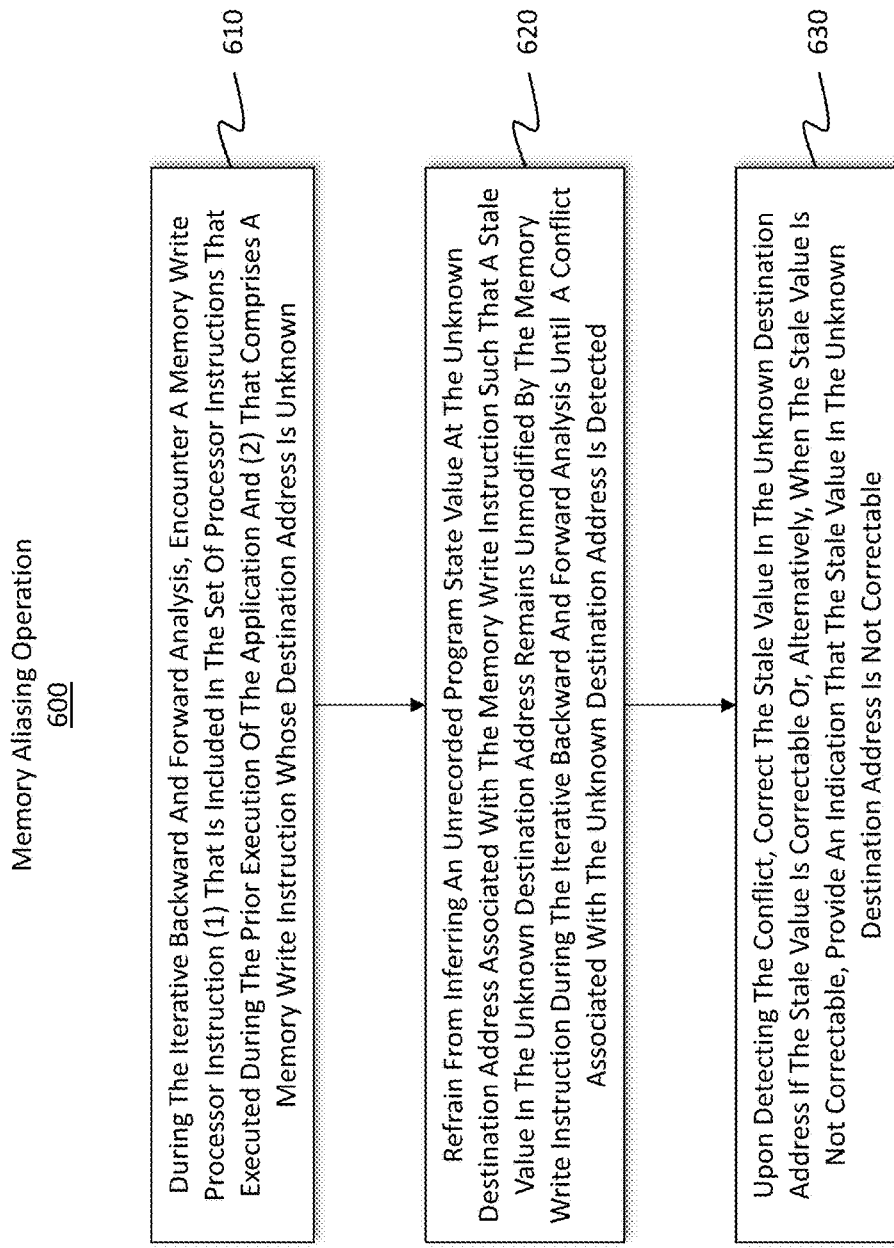
FIG. 6 illustrates a flow diagram of acts associated with methods for selectively refraining from making inferences during time travel debugging to mitigate memory aliasing problems.

Attention is now directed to FIG. 6, which illustrates a flow diagram 600 of various memory aliasing operations comprising acts that are associated with handling memory aliasing that can occur when performing reverse debugging based on control flow information and sparse hardware trace data.

As shown, the first illustrated act is an act of encountering a memory write processor instruction during the iterative backward and forward analysis of time travel debugging (act 610). This memory write instruction is included in the set of processor instructions obtained from control flow information in a sparse hardware trace, which executed during the prior execution of the application, relative to the timing of the recorded core dump state information (or other extracted recorded state information) that is obtained for the program. The write instruction is also an instruction to an unknown destination address.

In the disclosed embodiments, the debugging system is performing iterative backward and forward analysis of values to populate an inference graph. However, upon detecting the memory write instruction to the unknown destination address (act 610), the system refrains from making any inferences with the unrecorded program state value at the unknown destination address corresponding to that write instruction (act 620). This results in a stale value in the unknown destination address remaining unmodified by that memory write instruction to the unknown destination address during the iterative backward and forward analysis unless and until a conflict is detected that is also associated with the unknown destination address.

Then, upon detecting such a conflict, the stale value in the unknown destination address is corrected, if it is correctable, or, alternatively, it remains uncorrected, if it is uncorrectable (act 630). The value is correctable if other heuristics or other information in the control flow can be used to ascertain what the value should be. This may result, for example, from examining another write operation that specifies an address for the unknown destination address.

Figure 7:
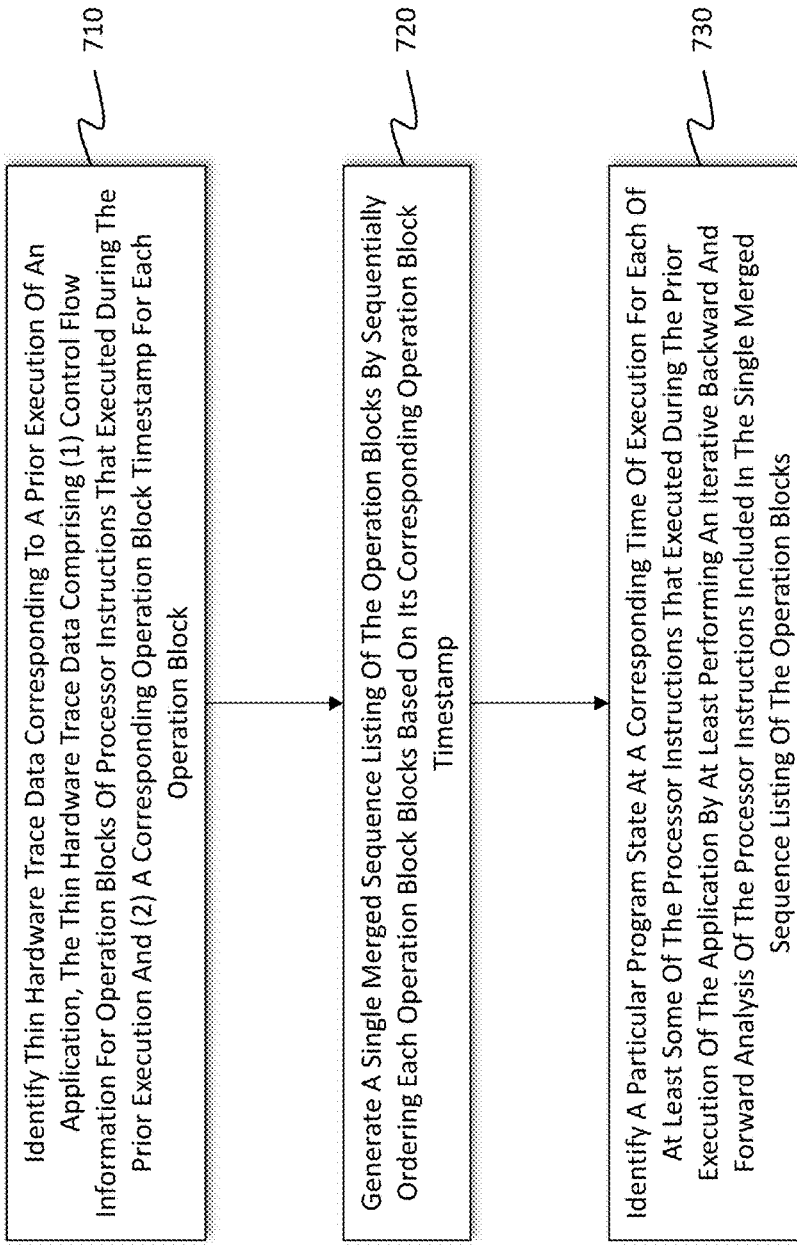
FIG. 7 illustrates a flow diagram of acts associated with multi-thread time travel debugging and that includes merging sequences of operations together from different threads.

Attention will now be directed to FIGS. 7-0, which illustrate embodiments related to addressing concurrency problems associated with multi-thread debugging.

FIG. 7 illustrates a flow diagram 700 of acts associated with concurrency operations related to embodiments for generating merged sequence listings that are usable for performing time travel debugging of multi-thread processes. These multi-thread processes can include multiple threads associated with the operation of a single application that are processed on a single processor or different threads processed on a multi-core processor or multiple processors.

When the system crashes and provides a dump of a final recorded state or an operator selects a selection point for obtaining a final recorded state of the program at that selection point, the various hardware trace data preceding that final recorded state can be obtained to perform debugging with the recorded state information. In some instances, the hardware trace data comprises thin/sparse hardware trace data, as previously described, which specifies the control flow information for operation blocks of processor instructions that executed during the prior execution of the application. In some instances, such as multi-thread process embodiments, the control flow information comprises a plurality of different operation/code blocks associated with a plurality of different threads. In such instances, the control flow information also includes at least one operation block timestamp for each block, but without including a separate timestamp for each processor instruction within each block.

In some instances, the thin hardware trace data can be identified (act 710) when it is obtained from a remote system corresponding to a crash of a remote system. In other instances, the thin hardware trace data is identified (act 710) through an IDE in which an operator selects a break/selection point from which to begin analysis and the IDE identifies the processor instructions preceding the selection point at which the selected/final recorded state of the program is identified.

Once the thin hardware trace data is obtained (act 710) from one or more hardware traces and which comprises a plurality of different operation blocks associated with different threads, those operation blocks are merged into a single merged sequence (act 720). The ordering of the operation blocks in the single merged sequence is based, in some instances, on the operation timestamp associated with each operation block. The operation timestamp may be a timestamp corresponding to a first instruction that was processed within each corresponding operation block, or another timestamp. The timestamp may also be an actual time, a cycle count, or any other relative timestamp measure, which can be used to distinguish relative operation time between the different operation blocks.

Once the single merged sequence listing is generated (act 720), it is used to perform the aforementioned time travel debugging (act 730) with the iterative backward/forward analysis and which may further include selectively locking certain values from being used to make inferences during the iterative backward/forward analysis. Even more particularly, this process includes identifying (e.g., deducing/inferring) the particular program state at a corresponding time of execution for each of at least some of the processor instructions that executed during the prior execution of the application (as identified in the merged sequential listing of the different sparse thread traces) and which was not previously recorded in the control flow information that was obtained directly from the separate sparse thread traces.

Figure 8:
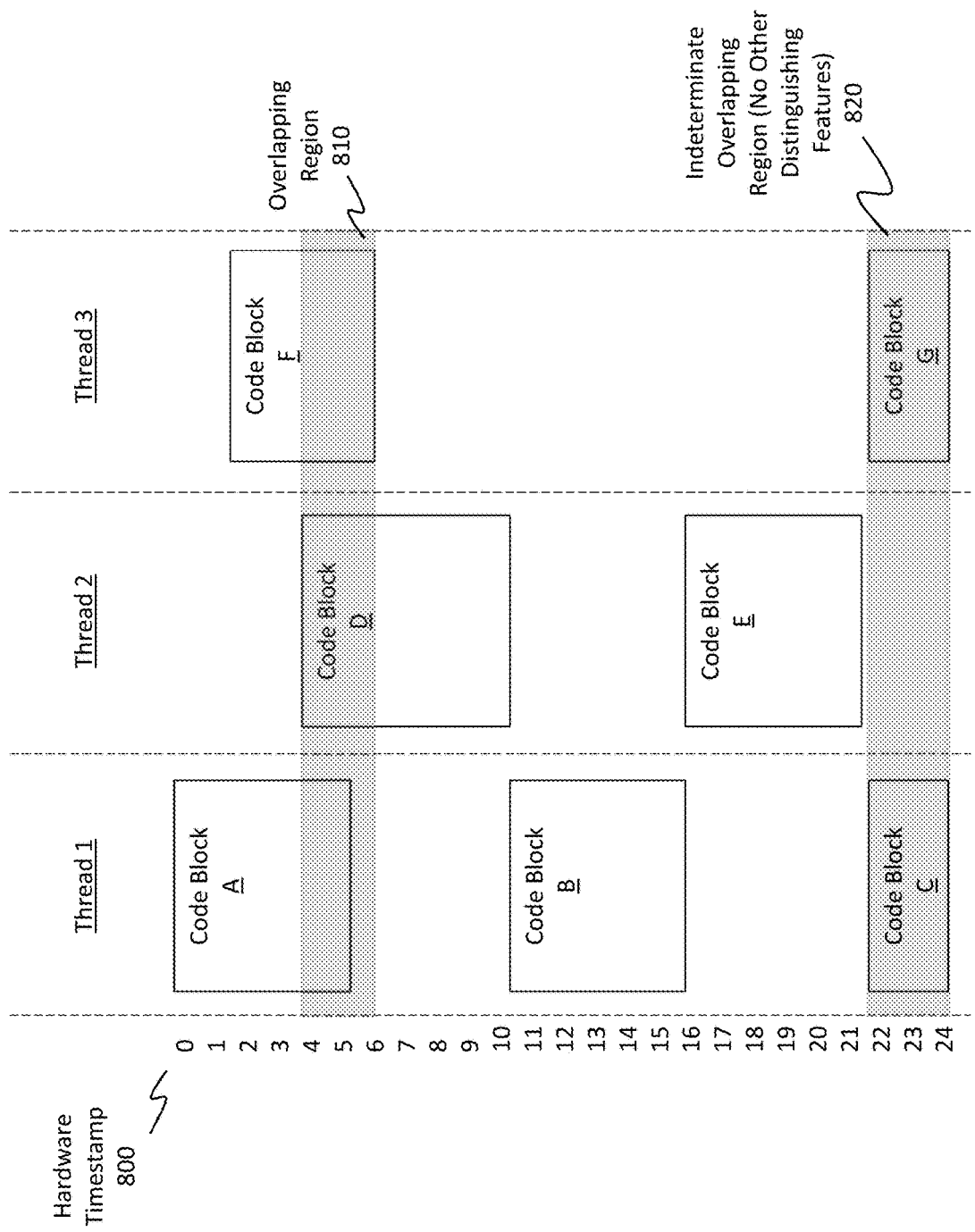
FIG. 8 illustrates an example of code blocks that are executed by different threads and in which some of the code blocks include processor instructions that are executed during concurrent time periods.

FIG. 8 illustrates an embodiment representing three different traces corresponding to three different threads that are executed during operation of an application. The first thread (Thread 1) is associated with execution of Code Block A, Code Block B and Code Block C. Thread 2 is associated with execution of Code Block D and Code Block E. Thread 3 is associated with Code Block F and Code Block G. Each of these Code Blocks (A-G) is associated with a plurality of separate processor instructions that are executed during operation of a single application. In the current embodiment, each of these Code Blocks (and their corresponding processor instructions) are identified from control flow information that is recorded in the thin/sparse hardware traces described above.

In the current multi-thread embodiments, such as applied to the current example, the Code Blocks are executed by separate threads, either on the same processor or different processors during operation of a corresponding application. The hardware timestamps 800 associated with the different Code Blocks (A-G) may also be obtained from the control flow data (e.g., as obtained from the sparse thread traces). The operation block timestamp may be a timestamp of a first instruction that was processed within each corresponding operation/code block (e.g., TS 0 for Code block A, TS 4 for Code Block D, etc.). The timestamp may also be an actual time, a cycle count, or any other relative timestamp measure, which can be used to distinguish relative operation time between the different operation blocks.

At least one timestamp (and sometimes multiple timestamps) may be identified for each Code Block (A-G). In some instances, this includes identifying some, but not all timestamps for all processor instructions included within each code blocks, such that it is not possible to determine (with certainty) the actual sequence of execution of different processor instructions that exist within code blocks when those code blocks are executed concurrently. By way of example, Code Block C and Code Block G are executed concurrently in the embodiment of FIG. 8 and it is unknown which processor instructions within Code Block C are executed before/after the individual processor instructions contained with Code Block G, since the execution appears to have been started at the same time (e.g., at execution time TS 22). This scenario represents a concurrency problem, inasmuch as it is not possible to ascertain the sequencing information that would typically be necessary to perform inferential time travel debugging utilizing a merged listing of the different processor instructions.

Notwithstanding the foregoing, the current embodiments are still able to build a useful merged listing of processor instructions by selectively determining when to arbitrarily order the processor instructions and code blocks that can be used to make inferences during the iterative backward/forward analysis and when to flag instructions/code blocks to refrain from using for making inferences in the iterative backward/forward analysis.

Figure 9:
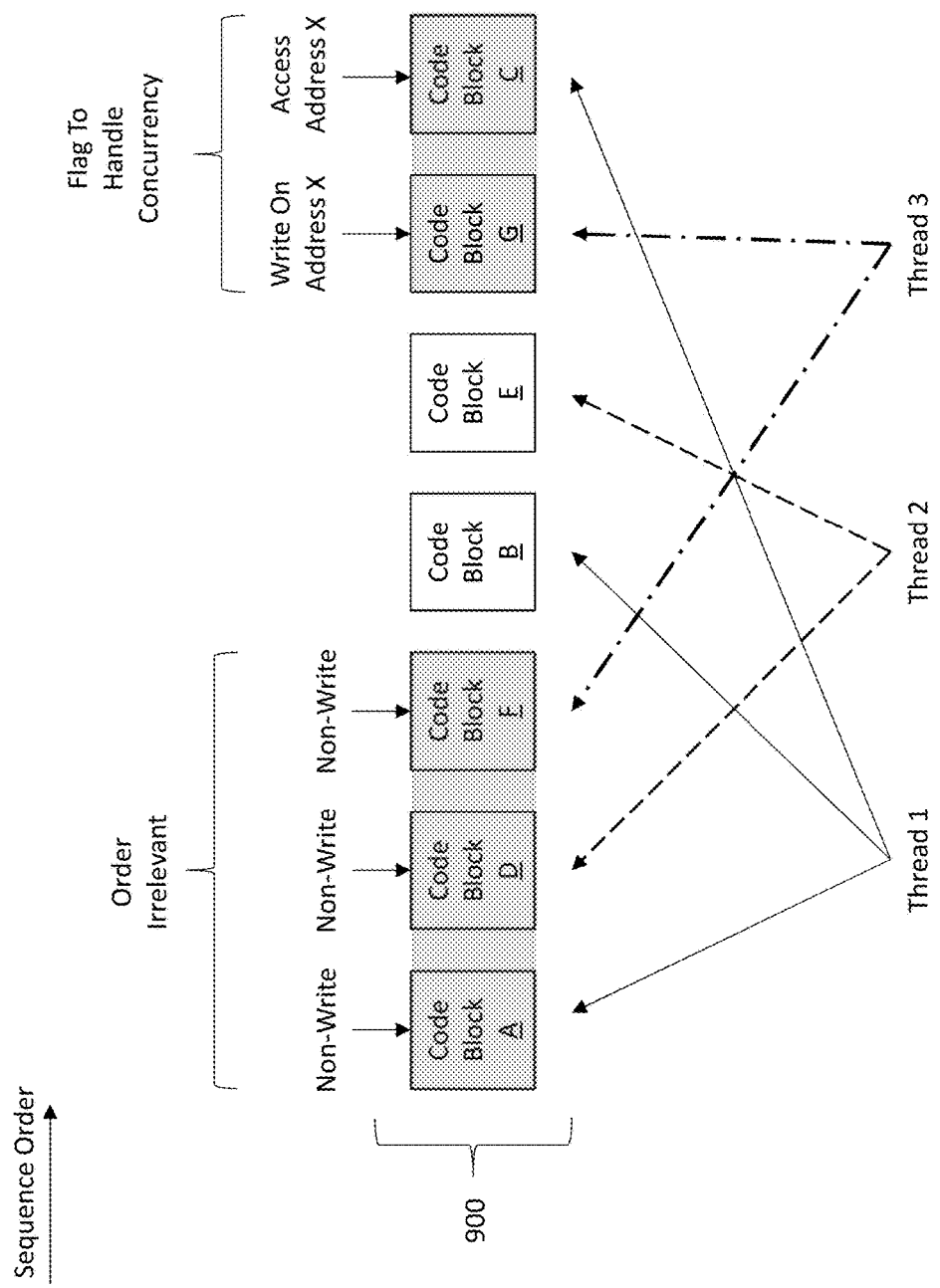
FIG. 9 illustrates another illustration of the example of code blocks from FIG. 8 in which the code blocks are merged into a single merged sequence for debugging.

To illustrate the foregoing, attention is directed to FIG. 9, which illustrates a merged sequence listing of processor instructions 900 that is based on ordering information (e.g., operation timestamps) obtained from the sparse hardware traces for the threads associated with Code Blocks (A-G) of FIG. 8.

Notably, in the current embodiment, the ordering of concurrently executed operation/blocks within the merged sequence of the operations 900 can be made arbitrarily when it is determined that there are no write operations within one of the concurrently operated code blocks to a same address location as another of the concurrently operated code blocks. For instance, Code Block A, Code Block D and Code Block F are operated concurrently, having at least some processor instructions that are overlapping in time. Because it is determined that none of these code blocks (Code Block A, D or F) have write instructions to a same memory location referenced by another of the concurrently overlapping code blocks (Code Block A, D or F), they can be written into the merged sequence 900 in an arbitrary ordering. Here Code Block D is listed before Code Block F, even though at least one operation timestamp associated with Code Block F appears to start before Code Block D. In this regard, the ordering of concurrently executed operations may be irrelevant. (E.g., Code Block F could be positioned ahead of Code Block A, for example).

In such embodiments when the ordering of concurrently executed blocks is irrelevant, the sequencing of the separate processor instructions for each operation block may be maintained together as a single continuous listing of instructions within the merged sequence of instructions 900 or, alternatively, intermixed with the processor instructions from another one of the concurrently executed operation blocks in the merged sequence of instructions 900 (not presently shown).

In some embodiments, an earliest operation timestamp associated with any concurrently executed operation blocks is used to control the sequential ordering within the merged listing, such that Code Block F would be sequenced ahead of Code Block D, even if the ordering is irrelevant. In other embodiments, the last operation timestamp of the concurrently executed operation blocks is used to sequence the processor instructions/blocks within the merged sequence of instructions 900.

Also, when there is no overlap or concurrency between operation/code blocks, the operation blocks are sequenced in the merged sequence of instructions 900 according to the relative operation timestamps of the different operation blocks. This is shown, for example, with Code Block B being positioned ahead of Code Block E in the merged sequence of operations 900.

In some instances, the ordering of concurrently executed operation blocks may be relevant and can trigger selective flagging of operation blocks to refrain from using during inferential time travel debugging analysis with the merged sequential listing of processor instructions. For instance, Code Blocks C and G may both access a same memory location with separate processor instructions in their respective code blocks. One of those processor instructions may also comprise a write instruction. In such an instance, Code Blocks C and G may be related, with some sort of interdependency, and cannot be resolved with the simple operation block timestamps.

Accordingly, in the current example, Code Blocks C and G are flagged to prevent their usage in inferring any values based on the state values of their processor instructions during the iterative backward/forward analysis of the merged sequential listing. Even more particularly, the control flow information for Code Block C and Code Block G, which is obtained from the sparse hardware traces of Threads 1 and 3, will be flagged during the construction of a data inference graph of the merged sequential listing 900 and will not be used to make inferences of corresponding state data within the data inference graph, similar to the flagging and omitted usage of values associated with write operations to unknown addresses during the aforementioned iterative backward/forward analysis (e.g., as described in reference to the address in cell 530 of FIG. 5B, for example). This will prevent a potential of exponentially increasing analysis from having to be applied during the inferential analysis steps, which might otherwise need to be performed to consider all possible sequencing scenarios for all potentially order critical operations.

While this selective ordering and selective usage of control flow information for code blocks of a multi-thread operation may limit the total quantity of inferences that can be made during debugging, this type of selective ordering and usage of control information can provide significant scalability of the time travel debugging for multi-thread operations by limiting the total quantity of unknown inferences that have to be tracked (which could otherwise be exponential and overwhelm/crash the debugger) and while still enabling a significant quantity of inferences to still be made.

Figure 10:
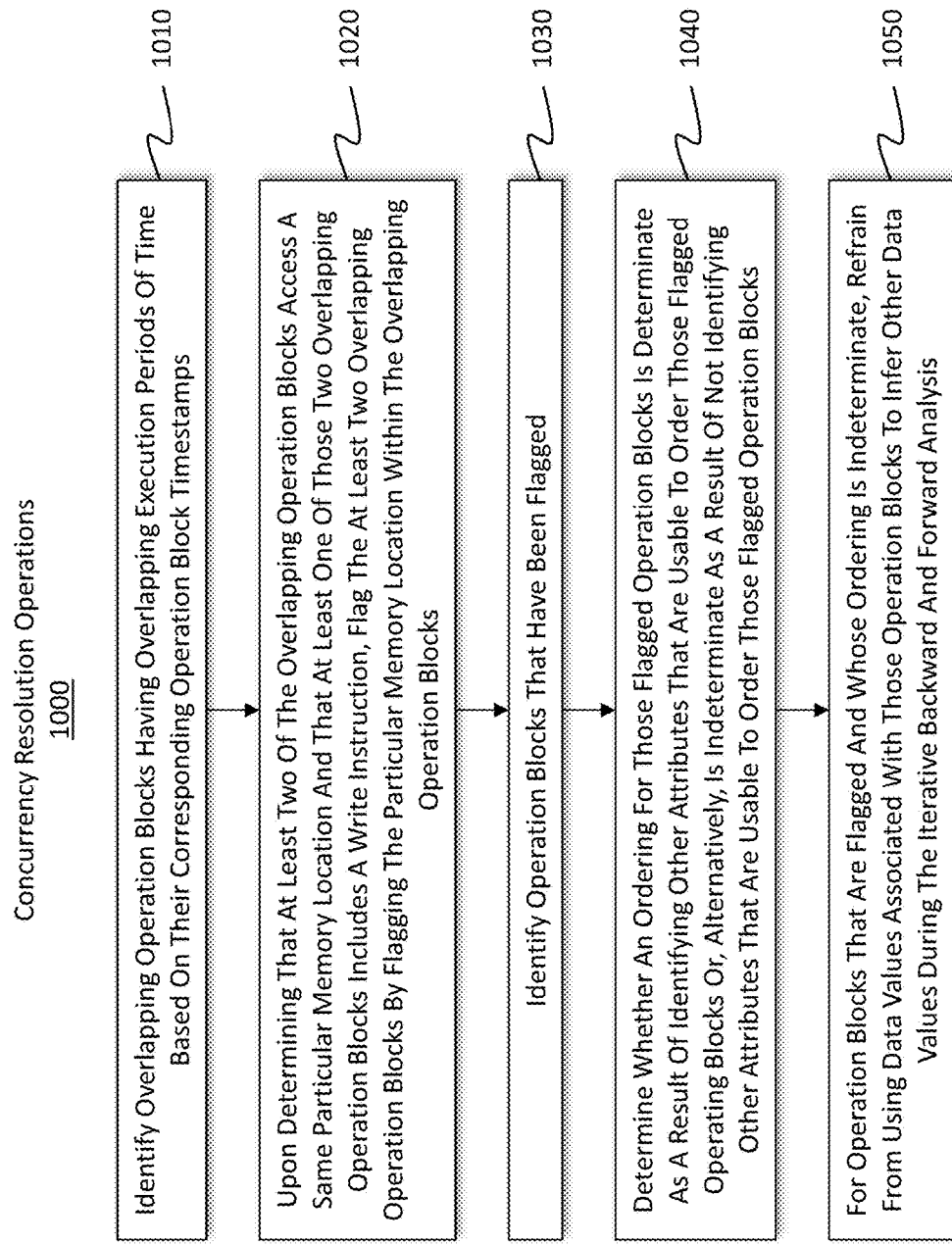
FIG. 10 illustrates a flow diagram of acts associated with multi-thread time travel debugging and that includes merging sequences of operations together from different threads.

FIG. 10 illustrates a flow diagram 1000 of concurrency operations, such as described above, which may be used to selectively identify values to lock from using for inferential debugging analysis.

As shown, the first step involves identifying overlapping operation blocks having overlapping execution periods of time based on their corresponding operation block timestamps. (act 1010). With regard to FIG. 9, this may include determining that Code Block C has operation block timestamps of 22-24, which overlap with the same operation block timestamps of Code Block G, for example, which means they were executed with concurrent time periods.

Next, upon determining that at least two of the overlapping operation blocks access a same particular memory location and that at least one of those two overlapping operation blocks includes a write instruction, then the memory values from the overlapping operation blocks are flagged to prevent their usage in the inferential backward/forward analysis described above (act 1020). It will be appreciated that this may include flagging the entire operation blocks, or only the specific operations in those operation blocks and/or values that are associated with that particular memory location.

Next, upon identifying those operation blocks that have been flagged (act 1030) (e.g., operation blocks having memory values that are flagged), a determination is made as to whether the ordering for those blocks is determinate or not (act 1040). This determination can be made, for example, based on the other attributes within the operation blocks or that is extracted from the control flow information obtained in the sparse hardware traces for the corresponding threads. In some instances, for example, instructions in the operation blocks may specify inter-dependencies between processor instructions from the different code blocks that reflect relative ordering of the operation blocks and/or the processor instructions within each of the processor blocks.

If relative ordering information for the concurrently operation blocks (particularly the flagged operation blocks) can be determined from additional attributes and information for the different operation blocks (e.g., information other than the first operation block timestamp), then the flagged operation blocks (e.g., blocks having flagged memory values) are sequenced/ordered within the merged sequence of instructions 900 according to that relative ordering information. In some instances, this also includes unflagging the operation blocks (e.g., unflagging the memory values for the blocks), once those blocks are properly ordered, so they can be considered for making inferences during the iterative backward/forward analysis described earlier.

Otherwise, if the ordering of flagged operation blocks (e.g., blocks having flagged memory values) is still indeterminate after analyzing other attribute information (e.g., information besides just the operation block timestamps), then the memory access instructions for these operation blocks remain flagged to not be used for making inferences during the iterative backward/forward analysis. As indicated above, this may comprise flagging only the specific instructions or values within the flagged operation blocks that correspond to the particular memory location, while enabling the other instructions/values within the flagged operation blocks to be used for making inferences. In some alternative embodiments, this involves flagging an entire operation block and or set of instructions within a block to prevent any of their instructions/values from being used in making inferences during the backward/forward analysis.

It will be appreciated from the foregoing that the disclosed embodiments bring about many substantial benefits both to how an application is debugged (especially an already-deployed application) and to how a computer system operates. More specifically, the embodiments improve debugging techniques because they can be used to resolve both memory aliasing issues in which write instructions are directed to an unknown memory location (as a result of having only a limited amount of state information during time travel debugging) as well as concurrency issues in which lightweight hardware trace data (e.g., control flow information) is collected for multiple different threads. By practicing the disclosed principles, developers will be provided with substantially more information when debugging a deployed application. Furthermore, clients/customers will be benefited because they will not need to install heavyweight tracing applications.

Because the developer is provided with more substantive information, the operations of the underlying computer system and application will also be improved. For instance, because the embodiments provide more robust debugging data, the developer will be able to more accurately pinpoint bugs and resolve those bugs. Consequently, these operations directly and significantly improve how a computer system operates because the developer will be able to better resolve application bugs and other errors.

Example Computer System(s)

Figure 11:
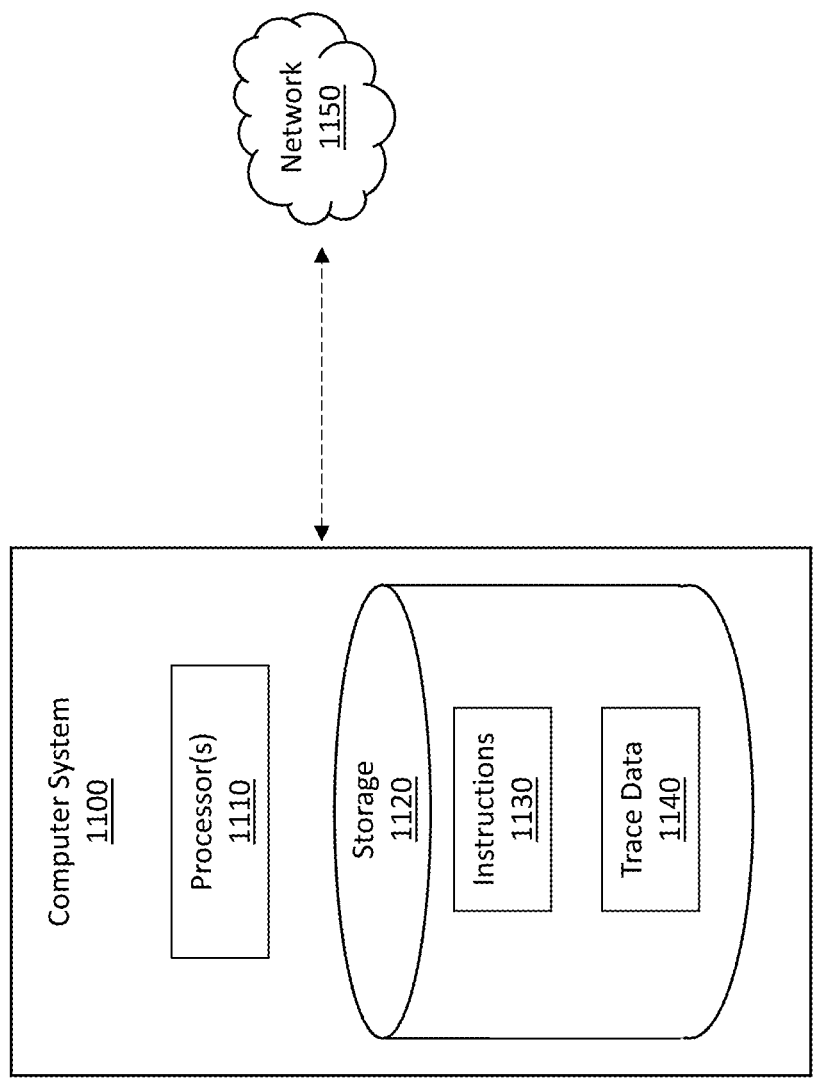
FIG. 11 illustrates a computing environment/architecture comprising a computer system that is included within or that can be used to implement the disclosed embodiments.

Attention will now be directed to FIG. 11 which illustrates an example computer system 1100 that may be used to facilitate the operations described herein. Computer system 1100 may take various different forms. For example, in FIG. 11, computer system 1100 may be embodied as a tablet, a desktop, a distributed system that includes one or more connected computing components/devices that are in communication with computer system 1100, a laptop computer, a mobile phone, a server, a data center, and/or any other computer system.

In its most basic configuration, computer system 1100 includes various different components. For example, FIG. 11 shows that computer system 1100 includes at least one processor 1105 (aka a "hardware processing unit") and storage 1110.

Storage 1210 is shown as including executable code/instructions 1115 and trace data 1120, which is representative of the trace data discussed earlier. Storage 1110 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well. As used herein, the term "executable module," "executable component," or even "component" can refer to software objects, routines, or methods that may be executed on computer system 1100. The different components, modules, engines, and services described herein may be implemented as objects or processors that execute on computer system 1100 (e.g. as separate threads).

The disclosed embodiments may comprise or utilize a special-purpose or general-purpose computer including computer hardware, such as, for example, one or more processors (such as processor 1105) and system memory (such as storage 1110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may be connected through one or more wired or wireless networks 1125 to remote systems(s) that are configured to perform any of the processing described with regard to computer system 1100. A "network," like the network 1125 shown in FIG. 11, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1125. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1205). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising: one or more processors; and
    one or more computer-readable hardware storage devices having stored thereon computer-executable instructions that are executable by the one or more processors to cause the computer system to:
    obtain a set of recorded state values corresponding to a prior execution of an application;
    identify thin hardware trace data corresponding to the prior execution of the application, the thin hardware trace data comprising hardware trace data that includes (1) control flow information for a plurality of operation blocks of processor instructions that executed during the prior execution of the application and (2) a corresponding operation block timestamp for each operation block included in the plurality of operation blocks, wherein at least some of the operation blocks in the plurality of operation blocks are executed by different processor threads;
    generate a single merged sequence listing of the plurality of operation blocks by sequentially ordering each operation block of the plurality of operation blocks based on its corresponding operation block timestamp; and
    identify a particular program state at a corresponding time of execution for each of at least some of the processor instructions that executed during the prior execution of the application by at least performing an iterative backward and forward analysis of the processor instructions included in the single merged sequence listing of the plurality of operation blocks;
    wherein the sequentially ordering of the plurality of operation blocks includes:
    identifying at least two of overlapping operation blocks accessing a same particular memory location, the overlapping operation blocks having overlapping execution time periods based on their corresponding operation block timestamps.

2. The computer system of claim 1, wherein execution of the computer-executable instructions further causes the computer system to:
    as a part of sequentially ordering the plurality of operation blocks, identify at least two overlapping operation blocks having overlapping execution periods of time based on their corresponding operation block timestamps; and
    arbitrarily order processor instructions for the overlapping operation blocks within the merged sequence listing such that at least two processor instructions in the merged sequence listing are ordered in a different sequence than how the at least two processor instructions were actually executed during the prior execution of the application.

3. The computer system of claim 1, wherein execution of the computer-executable instructions further causes the computer system to:
    as a part of sequentially ordering the plurality of operation blocks, identify overlapping operation blocks having overlapping execution periods of time based on their corresponding operation block timestamps;
    upon determining that at least two of the overlapping operation blocks access a same particular memory location and that at least one of the at least two overlapping operation blocks includes a write operation, flag the particular memory location so that a value recovered from the particular memory location is not used to make an inference in the iterative backward and forward analysis of the set of processor instructions included in the single merged sequence listing of the plurality of operation blocks that executed during the prior execution of the application.

4. The computer system of claim 1, wherein one or more particular processor instructions included within a particular one of the plurality of operation blocks are not provided with a corresponding timestamp but rather are grouped under a particular timestamp corresponding to the particular one operation block.

5. The computer system of claim 1, wherein processor instructions included within a same operation block are all performed by a same thread.

6. The computer system of claim 1, wherein the single merged sequence listing is scalable to accommodate any number of operation blocks.

7. The computer system of claim 1, wherein the application is executing on a remote computer system and the set of recorded state values are received from the remote computer system or, alternatively, the application is executing on the computer system and the set of recorded state values are generated by the computer system.

8. The computer system of claim 1, wherein a data inference graph is maintained as a part of the iterative backward and forward analysis, the data inference graph being used to track how a particular data value associated with a particular processor instruction included in the processor instructions is inferred in both forward and backward directions of the iterative backward and forward analysis.

9. A computer system comprising:
one or more processors; and
one or more computer-readable hardware storage devices having stored thereon computer-executable instructions that are executable by the one or more processors to cause the computer system to:
 obtain a set of recorded state values corresponding to a prior execution of an application;
 identify thin hardware trace data corresponding to the prior execution of the application, the thin hardware trace data comprising hardware trace data that includes (1) control flow information for a plurality of operation blocks of processor instructions that executed during the prior execution of the application and (2) a corresponding operation block timestamp for each operation block included in the plurality of operation blocks, wherein at least some of the operation blocks in the plurality of operation blocks are executed by different processor threads;
 generate a single merged sequence listing of the plurality of operation blocks by sequentially ordering each operation block of the plurality of operation blocks based on its corresponding operation block timestamp;
 as a part of sequentially ordering the plurality of operation blocks:
  identify overlapping operation blocks having overlapping execution periods of time based on their corresponding operation block timestamps; and
  upon determining that at least two of the overlapping operation blocks access a same particular memory location and that at least one of the at least two overlapping operation blocks includes a write instruction, flag the at least two overlapping operation blocks.

10. The computer system of claim 9, wherein execution of the computer-executable instructions further causes the computer system to:
identify operation blocks that have been flagged, including the at least two overlapping operation blocks; and
determine whether an ordering for those flagged operation blocks is determinate or is indeterminate.

11. The computer system of claim 10, wherein the ordering for those flagged operation blocks is determinate when other attributes of those flagged operation blocks are used to order those flagged operation blocks.

12. The computer system of claim 11, wherein the other attributes include additional timestamp information sufficient to determine the ordering for those flagged operation blocks.

13. The computer system of claim 10, wherein execution of the computer-executable instructions further causes the computer system to:
for operation blocks that are flagged and whose ordering is indeterminate, refrain from using data values associated with those indeterminate operation blocks to infer other data values during the iterative backward and forward analysis.

14. The computer system of claim 13, wherein, as a result of refraining from using those data values to infer the other data values, those data values are locked from being used to infer the other data values.

* * * * *